Patented Sept. 12, 1950

2,521,678

UNITED STATES PATENT OFFICE 2,521,678

PROCESS OF PREPARING ORGANOPOLY-SILOXANE RESINS

Halbert C. White and Edgar C. Britton, Midland, Mich., assignors to The Dow Chemical Company, Midland, Mich., a corporation of Delaware No Drawing. Application March 29, 1947, Serial No. 738,231

3 Claims. (Cl. 260—46.5)

This invention relates to the preparation of heat-hardenable organopolysiloxane resins. It is particularly concerned with the preparation of complex polymeric materials from organopolysiloxanes in which the organic radicals comprise lower alkyl and aryl radicals attached directly to silicon atoms, the ratio of the total number of organic radicals to the total number of silicon atoms being within the range of 1.0–1.5. The process of this invention is more particularly concerned with organopolysiloxane starting materials, as above described, in which lower alkyl radicals constitute from 60 to 100 percent of the total number of organic radicals present. All valences of silicon not taken up by organic radicals are satisfied by oxygen atoms serving as linkages between silicon atoms.

Organopolysiloxane starting materials of the type described may be conveniently prepared by methods well-known to the art, e. g. by the hydrolysis, and concurrent condensation of the hydrolysis products, of suitable hydrolyzable organosilanes. Frequently, a mixture of hydrolyzable silanes is employed, said mixture having an average composition as defined above. Illustrative examples of mixtures of hydrolyzable organosilanes which will yield hydrolysis products suitable for use as starting materials in the process of this invention are given in the following table, but it will be apparent that the invention is not limited to said mixtures.

Table I

| Mixture | Components | Parts by Weight |
|---|---|---|
| 1 | methyltriethoxysilane | 93 |
|   | trimethylethoxysilane | 7 |
| 2 | ethyltrichlorosilane | 85 |
|   | diethyldichlorosilane | 15 |
| 3 | methyltrichlorosilane | 57 |
|   | phenyltrichlorosilane | 40 |
|   | trimethylethoxysilane | 3 |

The hydrolysis of mixtures of the types illustrated above usually results in formation of intermediate products which are readily soluble in organic solvents, e. g. toluene, but which are easily converted to insoluble, non-volatile solids by methods known to the art, e. g. by heating at 150° C. or higher. However, the known methods frequently result in a too rapid rate of conversion of the hydrolysis products to the non-liquefiable state, and particles of insoluble complex gel-like bodies are formed, which are useless and even detrimental for practical applications. It is desirable that the rate of conversion to the solid state be such that a uniformly soluble product be present at all stages of the process. It is likewise highly desirable that the process be arrestable at any stage of resinification.

We have found that the organosiloxane polymers having an average ratio of from 1.0 to 1.5 hydrocarbon radicals per atom of silicon, as described above, may be polymerized in a stepwise manner to produce heat-hardenable polymers. The formation of insoluble gels or solids prior to the final "setting up" is eliminated or substantially reduced. Briefly, our invention comprises treating a solution of the organosiloxane in a stepwise manner with an alkaline reacting substance, and intermittently decreasing the concentration of the organosiloxane in the reaction mixture by adding thereto further portions of the diluent.

The preferred diluents are organic liquids which normally are good solvents for organosiloxanes, e. g. liquid aromatic hydrocarbons such as benzene, toluene, or xylene, or chlorinated hydrocarbons such as carbon tetrachloride, or chlorobenzene, etc. The optimum concentration of diluent in the reaction mixture varies, of course, with the starting materials and the conditions under which the reaction is conducted. In general, the more diluent present in the reaction mixture, the slower is the rate of viscosity increase, but usually the diluent constitutes from 50 to 10 percent by weight of the reaction mixture. However, as indicated, greater or lesser proportions may also be employed.

As an alkaline reacting substance we prefer sodium hydroxide, but other alkaline agents, e. g. quaternary ammonium hydroxides, potassium hydroxide, etc., may be employed if desired. The alkali may be introduced into the reaction mixture as an aqueous solution, or as an aqueous emulsion in the diluent being used. Apparently a portion of the alkali is consumed in the reaction, e. g. in the formation of alkali metal salts of unknown identity. For instance, it has been observed that following the addition to the reaction mixture of a small portion of alkali, e. g. from 0.1 to 0.2 molecular equivalent weight of alkali per 100 atomic equivalents of silicon, the viscosity of the mixture increases perceptibly for awhile, but finally reaches an apparent state of equilibrium with little further change in viscosity over a period of several minutes. However, if another portion of the alkaline agent is then added, the rate of viscosity change again increases until another plateau is reached, etc.

The reaction mixture should, of course, be vigorously agitated during the treatment. In practice, this portion-wise addition of the alkali is usually continued until the reaction mixture becomes too viscous for thorough agitation. Additional diluent may then be added, and the process continued until the desired degree of resinification is obtained, as indicated by attainment of a viscosity predetermined to be satisfactory for the intended application. Throughout the later stages of the above-described alternate alkali-diluent treatments, the polymeric complex material may appear to gel at places in the reaction mixture, but such bodies may be readily dispersed by passage of the mixture through a colloid mill, or by any other desired means. Residual alkali may be neutralized by any convenient method, e. g. by reaction with an acid, such as hydrochloric acid, or acetic acid, by bubbling carbon dioxide gas through the mixture, etc. Solids, e. g. an alkali metal carbonate and other contaminants, may be removed by passing the product through a screen.

The process of this invention may be carried out over a wide range of temperatures, e. g. from room temperature, or below, to 100° C. or higher. Ordinarily, we prefer to operate at temperatures in the range of from 20° C. to 80° C.

The process, as just described, permits production of toluene-soluble, thermosetting organopolysiloxanes, having an average of from 1 to 1.5 organic radicals per atom of silicon, which soluble organopolysiloxanes are of greater molecular weight than have heretofore been obtained from similar starting materials. In general, the thermosetting resinous products have greater flexural strength and undergo less shrinkage when subjected to prolonged heating than the untreated organosiloxanes from which they are formed. The products are useful for a variety of purposes. They are of particular value as heat-insulating materials, binding agents, molding compositions, etc.

The following examples serve to illustrate modes of applying the principle of the invention, but are not to be construed as limiting its scope:

*Example 1.*—A toluene solution of a mixture comprising 576 parts by weight of methyltrichlorosilane, 408 parts of phenyltrichlorosilane, and 16 parts of trimethylchlorosilane was added with stirring to aqueous isopropyl alcohol. The resultant hydrolysis product was washed free of chlorides, dried and concentrated to a resin base content of 60 percent by weight in toluene.

To a 200 gram portion of the resultant solution of methyl phenyl polysiloxane was added 0.6 ml. of aqueous 50 percent sodium hydroxide solution as droplets over a period of about 2.2 hours. Throughout the experiment, the reaction mixture was maintained at about 70° C., with constant stirring. It was noted that following the addition of each portion of alkali, the viscosity of the reaction mixture increased to some extent. However, upon addition of the final drop of alkali, the viscosity increased very rapidly. At this point 100 milliliters of toluene was added to the mixture, and vaporous carbon dioxide was bubbled through for several minutes. The viscosity of a toluene solution containing 40 percent by weight of the resultant resin base was determined. At this concentration in toluene, the viscosity of the treated methyl phenyl polysiloxane was 170 centipoises, while that of the untreated material was 15 centipoises.

The alkali treated methyl phenyl polysiloxane of this example was freed of the toluene and was admixed with an equal weight of powdered asbestos and molded into a test bar at 175° C. under 2000 pounds pressure. For purposes of comparison, the untreated methyl phenyl polysiloxane was molded into a test bar having the same dimensions. The test bars were subsequently heated at 200° C. for 8 hours after which they were measured for shrinkage. The following Table II gives the shrinkage, expressed as percent decrease in length, in each instance.

*Table II*

| Test Piece Containing— | Decrease in Length, Per Cent |
|---|---|
| alkali-treated resin | 1.04 |
| untreated resin | 2.08 |

Subsequently, flexural strength was determined on the test pieces, at 25° C. and at 200° C., under comparable conditions. Table III gives the results which were obtained.

*Table III*

| Test Piece Containing— | Flexural Strength (Pounds per sq. in.) | |
|---|---|---|
| | 25° C. | 200° C. |
| alkali-treated resin | 5,400 | 3,740. |
| untreated resin | 4,130 | less than 2,000. |

*Example 2.*—A methyl siloxane resin was prepared by reacting a toluene solution of a mixture comprising 91 parts by weight of methyltrichlorosilane and 9 parts of trimethylchlorosilane with cold water. The resultant product was washed free of chlorides, dried and concentrated to a resin base content of 60 percent by weight in toluene. The viscosity at this concentration was 15 centistokes.

By procedure similar to that described in Example 1, aqueous 50 percent sodium hydroxide was added in 5 intermittent portions over a period of 55 minutes to give a silicon:sodium atomic ratio of approximately 160:1. Throughout the treatment, the temperature of the reaction mixture was maintained at approximately 25° C. From time to time additional toluene was also introduced. The final solution had a resin base content of 22 percent, and a viscosity of 90 centistokes. To insure complete homogeneity, the product was passed through a colloid mill.

Test bars molded from the alkali-treated methyl polysiloxane of this example had a flexural strength of 2945 pounds per square inch at 25° C. Attempts to mold bars from the untreated methyl polysiloxane, under comparable conditions, were unsuccessful, as the material set up and cracked during the molding operation.

Other modes of applying the principle of the invention may be employed instead of those explained, change being made as regards the compounds and materials herein disclosed, provided the steps or compounds stated by any of the following claims or equivalent of such steps or compounds be employed.

We therefore point out and claim:

1. The method which comprises dissolving a soluble hydrocarbon-substituted organosiloxane, containing an average of at least one and not more than 1.5 hydrocarbon radicals per silicon atom, in an inert solvent of the group consisting of aromatic hydrocarbons, chlorinated hydrocarbons, and petroleum fractions distilling within the range of 80°–180° C., to form a solution having a resin content of from 90 to 50 percent by weight, polymerizing the organosiloxane by repeatedly treating said solution portionwise with an alkaline agent and with said solvent, the alkaline agent being of the class consisting of alkali metal hydroxides and quaternary ammonium bases and each added portion thereof being in amount corresponding to not more than 0.2 gram molecular equivalent of the alkali per 100 gram atomic weights of silicon in the organosiloxane under treatment, discontinuing addition of the alkali while the organosiloxane remains soluble in the solvent, thereafter neutralizing residual alkali and recovering the resinous product.

2. The method of treating hydrocarbon-substituted polysiloxane resins in which the ratio of the total number of hydrocarbon radicals to the total number of silicon atoms is at least 1.0 and not more than 1.5, and in which lower alkyl radicals constitute at least 50 percent of the total number of hydrocarbon radicals, the remaining hydrocarbon radicals being aryl radicals, which comprises dissolving the liquid intermediate resins obtained by the hydrolysis of suitable mixtures of hydrolyzable organosilanes in an inert solvent of the group consisting of aromatic hydrocarbons, chlorinated hydrocarbons, and petroleum fractions distilling within the range of 80°–180° C., to form a solution having a resin base content of from 90 to 50 percent by weight, polymerizing the organosiloxane by intermittently adding to said solution portions of an alkaline agent and portions of said organic solvent, the alkaline agent being of the class consisting of alkali metal hydroxides and quaternary ammonium bases and each added portion thereof being in amount corresponding to not more than 0.2 gram molecular equivalent of the alkali per 100 gram atomic weights of silicon in the organosiloxane under treatment, discontinuing addition of the alkali while the organosiloxane remains soluble in the solvent, thereafter neutralizing residual alkali and recovering a resinous product of improved properties.

3. The method of treating methyl-phenyl polysiloxane resins in which the ratio of the total number of methyl and phenyl radicals to the total number of silicon atoms is at least 1.0 and not more than 1.5, and in which the methyl radicals constitute at least 50 percent of the total number of methyl and phenyl radicals, which comprises dissolving the liquid intermediate product obtained by the hydrolysis of suitable mixtures of hydrolyzable methyl substituted silanes and phenyl substituted silanes in an inert solvent of the group consisting of aromatic hydrocarbons, chlorinated hydrocarbons, and petroleum fractions distilling within the range of 80°–180° C., to form a solution containing from 90 to 50 percent by weight of the said methyl-phenyl polysiloxane intermediate product, polymerizing the methyl-phenyl polysiloxane by intermittently adding to said solution portions of an alkaline agent and portions of said organic solvent, the alkaline agent being of the class consisting of alkali metal hydroxides and quaternary ammonium bases and each added portion thereof being in amount corresponding to not more than 0.2 gram molecular equivalent of the alkali per 100 gram atomic weights of silicon in the organosiloxane under treatment, discontinuing addition of the alkali while the organosiloxane remains soluble in the solvent, thereafter neutralizing residual alkali and recovering a resinous product.

HALBERT C. WHITE.
EDGAR C. BRITTON.

REFERENCES CITED

The following references are of record in the file of this patent:

UNITED STATES PATENTS

| Number | Name | Date |
| --- | --- | --- |
| 2,258,222 | Rochow | Oct. 7, 1941 |
| 2,371,068 | Rochow | Mar. 6, 1945 |
| 2,389,477 | Wright | Nov. 20, 1945 |
| 2,432,665 | Hyde | Dec. 16, 1947 |
| 2,443,353 | Hyde | June 15, 1948 |

FOREIGN PATENTS

| Number | Country | Date |
| --- | --- | --- |
| 573,960 | Great Britain | Dec. 14, 1945 |
| 583,875 | Great Britain | Jan. 1, 1947 |

OTHER REFERENCES

Meads et al.; J. Chem. Soc. (London) 1915, pp. 459 to 468.

Kipping et al.; J. Chem. Soc. (London) (1928), pp. 1427–1431.